(12) United States Patent
Pauls et al.

(10) Patent No.: US 12,078,492 B2
(45) Date of Patent: Sep. 3, 2024

(54) METHOD AND DEVICE FOR DETERMINING A HIGHLY PRECISE POSITION OF A VEHICLE

(71) Applicant: Robert Bosch GmbH, Stuttgart (DE)

(72) Inventors: Jan-Hendrik Pauls, Grossbottwar (DE); Carsten Hasberg, Ilsfeld-Auenstein (DE); Philipp Rasp, Wannweil (DE); Tobias Strauss, Obersulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 17/045,896

(22) PCT Filed: Apr. 8, 2019

(86) PCT No.: PCT/EP2019/058841
§ 371 (c)(1),
(2) Date: Oct. 7, 2020

(87) PCT Pub. No.: WO2019/201650
PCT Pub. Date: Oct. 24, 2019

(65) Prior Publication Data
US 2021/0140789 A1    May 13, 2021

(30) Foreign Application Priority Data
Apr. 20, 2018    (DE) .................... 10 2018 206 067.3

(51) Int. Cl.
*G01C 21/32*    (2006.01)
*G01C 21/00*    (2006.01)
*G01C 21/30*    (2006.01)

(52) U.S. Cl.
CPC ............. *G01C 21/32* (2013.01); *G01C 21/30* (2013.01); *G01C 21/3815* (2020.08); *G01C 21/3848* (2020.08)

(58) Field of Classification Search
CPC ................ G01C 21/3815; G01C 21/30; G01C 21/3848; G01C 21/32; G08G 1/167
See application file for complete search history.

(56) References Cited

U.S. PATENT DOCUMENTS 8,819,466 B2    8/2014   Hartwich
8,989,210 B2    3/2015   Hartwich et al.
(Continued)

FOREIGN PATENT DOCUMENTS

CN    103370669 A    10/2013
CN    107000752 A    8/2017
(Continued)

OTHER PUBLICATIONS

International Search Report for PCT/EP2019/058841, dated Jul. 19, 2019.

*Primary Examiner* — Abdalla A Khaled
(74) *Attorney, Agent, or Firm* — NORTON ROSE FULBRIGHT US LLP; Gerard A. Messina

(57) ABSTRACT

A method and a device for determining a highly precise position of a vehicle. The method includes a step of sensing environment data values, which represent an environment of the vehicle, the environment encompassing multiple environment features which have at least one regular structure, and the environment data values at least encompassing the at least one regular structure; a step of carrying out a comparison of the environment data values with a map; a step of determining the highly precise position of the vehicle as a function of the comparison; and a step of supplying a signal on the basis of the highly precise position.

7 Claims, 3 Drawing Sheets

(56) References Cited

U.S. PATENT DOCUMENTS

| | | |
|---|---|---|
| 9,644,975 B2 | 5/2017 | Stenborg et al. |
| 10,648,828 B2* | 5/2020 | Pink .................... G06V 20/588 |
| 10,948,302 B2* | 3/2021 | Kudrynski ............ G01S 13/867 |
| 11,313,976 B2* | 4/2022 | Otaki ........................ G01S 7/41 |
| 11,487,687 B2 | 11/2022 | Mutter et al. |
| 11,489,694 B2 | 11/2022 | Mutter et al. |
| 2009/0228204 A1* | 9/2009 | Zavoli .................... G01C 21/30 701/532 |
| 2010/0299063 A1* | 11/2010 | Nakamura ............ G06V 20/588 701/532 |
| 2011/0144907 A1* | 6/2011 | Ishikawa ................ G01C 21/30 701/532 |
| 2012/0210154 A1 | 8/2012 | Hartwich |
| 2012/0271540 A1* | 10/2012 | Miksa .................... G08G 1/167 701/409 |
| 2012/0310516 A1* | 12/2012 | Zeng ........................ G01S 17/04 701/300 |
| 2014/0379254 A1* | 12/2014 | Miksa .................... G01C 21/30 701/450 |
| 2015/0233720 A1* | 8/2015 | Harada .................. G06V 20/56 701/409 |
| 2015/0260530 A1* | 9/2015 | Stenborg ................ G01C 21/28 701/461 |
| 2016/0161265 A1* | 6/2016 | Bagheri .................. G01S 13/89 701/450 |
| 2017/0299397 A1* | 10/2017 | Ichikawa ................ B60R 11/04 |
| 2018/0003511 A1* | 1/2018 | Browning .......... G01C 21/3848 |
| 2018/0024562 A1* | 1/2018 | Bellaiche ............. G05D 1/0088 701/26 |
| 2018/0205572 A1 | 7/2018 | Kishigami et al. |
| 2018/0246518 A1* | 8/2018 | Vogel .................... G05D 1/0234 |
| 2019/0072674 A1* | 3/2019 | Otaki .................... G05D 1/0274 |
| 2019/0128678 A1* | 5/2019 | Merfels .................. G01C 21/32 |
| 2019/0204092 A1* | 7/2019 | Wheeler ................ G05D 1/0246 |
| 2019/0271551 A1* | 9/2019 | Stess .................... G01S 7/4808 |
| 2020/0088526 A1* | 3/2020 | Dousse .................. G01C 21/30 |
| 2020/0182628 A1* | 6/2020 | Bjernetun .......... G01C 21/3658 |
| 2020/0195239 A1 | 6/2020 | Wang et al. |
| 2020/0271473 A1* | 8/2020 | Wang .................... G08G 1/137 |
| 2020/0341473 A1* | 10/2020 | Raag .................. G01C 21/3848 |

FOREIGN PATENT DOCUMENTS

| | | |
|---|---|---|
| CN | 107404710 A | 11/2017 |
| DE | 102010033729 A1 | 2/2012 |
| DE | 102014201824 A1 | 8/2015 |
| DE | 102016215643 A1 | 8/2017 |
| DE | 102016214028 A1 | 2/2018 |
| DE | 102016214470 A1 | 2/2018 |
| DE | 102016214868 A1 | 2/2018 |
| DE | 102017207544 A1 | 11/2018 |
| EP | 2012211 A1 | 1/2009 |
| EP | 3130891 A1 | 2/2017 |
| JP | 2018025618 A | 2/2018 |
| KR | 20130089068 A | 8/2013 |
| WO | 2011023246 A1 | 3/2011 |
| WO | 2017202570 A1 | 11/2017 |

* cited by examiner

METHOD AND DEVICE FOR DETERMINING A HIGHLY PRECISE POSITION OF A VEHICLE

The present invention relates to a method and to a device for determining a highly precise position of a vehicle. The method includes a step of sensing environment data values; a step of carrying out a comparison of the environment data values with a map; a step of determining the highly precise position of the vehicle as a function of the comparison; and a step of supplying a signal on the basis of the highly precise position.

SUMMARY

A method according to an example embodiment of the present invention for determining a highly precise position of a vehicle includes a step of sensing environment data values representing an environment of the vehicle, the environment having a plurality of environment features which include at least one regular structure, and the environment data values including at least the at least one regular structure. In addition, the present method includes a step of carrying out a comparison of the environment data values with a map; a step of determining the highly precise position of the vehicle as a function of the comparison; and a step of supplying a signal on the basis of the highly precise position.

For example, a vehicle is to be understood as a road vehicle and/or a drone and/or an airplane and/or a train. More specifically, a road vehicle describes an automated vehicle. An automated vehicle is a partially, highly or fully automated vehicle.

The supply of the signal is preferably implemented in such a way that the vehicle is operated on the basis of the highly precise position, and/or the supply of the signal takes place in such a way that the map is updated as a function of the signal.

An operation of the vehicle means that the vehicle is operated in a partially, highly or fully automated manner, for instance. For example, the operation includes the determination of a trajectory for the vehicle and/or the traveling of the trajectory with the aid of an automated transverse and/or longitudinal control, and/or the execution of safety-relevant driving functions. In addition, for instance, the operation includes the display of a lane change message and/or the execution of a light control function, and/or the execution of at least one navigation task. A supply of the signal, for example, is meant to denote that the signal is supplied or transmitted with the aid of a (data) interface in such a way that the signal is received by at least one control unit of the vehicle for the operation.

A highly precise position is to be understood as a position that is precise within a predefined coordinate system, e.g., GNSS coordinates, such that this position does not exceed a maximally tolerated uncertainty. The maximum uncertainty, for example, may depend on the environment of the vehicle. Moreover, the maximum uncertainty may depend on whether the vehicle is operated in a partially, highly or fully automated manner, for instance. The maximum uncertainty is basically so low that a safe operation of the vehicle is ensured. For a fully automated operation of the vehicle, the maximum uncertainly has an order of magnitude of approximately 10 centimeters, for instance.

For example, a map is to be understood as a digital map, which is set up, for instance in conjunction with a navigation system and/or a control unit of the vehicle and/or in conjunction with a smartphone that is connected to the vehicle or encompassed by it, to determine a highly precise position of the vehicle and/or to execute a function as a function of the highly precise position, etc. In one specific embodiment, a map is to be understood as data values which particularly represent regular structures in conjunction with their positions and/or position characteristics (e.g., in the form of vectors).

An environment of a vehicle, for example, describes a region which is able to be sensed with the aid of an environment sensor system of the vehicle.

For example, an environment sensor system is to be understood as at least one video sensor and/or at least one radar sensor, and/or at least one lidar sensor, and/or at least one ultrasonic sensor, and/or at least one further sensor, which is developed to sense the environment of the vehicle in the form of environment data values.

The method according to an example embodiment of the present invention may advantageously solve the problem that a safe and reliable operation of a vehicle in many cases depends on the knowledge of a highly precise position of the vehicle, in particular if an automated vehicle is involved. In this context it is conventional to determine a (highly precise) position as a function of an environment feature. However, an individual environment feature must then also be uniquely sensed as such, identified and finally be uniquely allocated to a position, e.g., with the aid of a map. However, especially environment features that resemble one another and regularly repeat themselves may possibly lead to an imprecision of the position determination, which makes a safe operation impossible. The method described here supports the determination of the highly precise position by advantageously utilizing in particular the presence of regular structures for the purpose of determining a highly precise position.

The multiple environment features, for instance, are to be understood as road markings and/or traffic signs, and/or components of the infrastructure such as guardrail posts, etc., and the at least one regular structure—depending on the respective embodiment of the plurality of environment features—denotes a spatial distance between these multiple environment features. In a further embodiment, the at least one regular structure is to be understood as a time interval, e.g., as a function of the velocity of the vehicle, between the sensing instants at which the multiple environment features are detected with the aid of the environment sensor system. In a further embodiment, a spatially regular structure could also be understood as a time interval, e.g., as a function of the speed of the vehicle, between the sensing instants at which the multiple environment features are acquired with the aid of the environment sensor system.

The at least one regular structure preferably represents a periodic occurrence of the multiple environment features along a reference structure. In particular, the reference structure corresponds to a road marking and/or a trajectory of the vehicle.

A reference structure, for instance, is to be understood as what is known as a reference line, the multiple environment features being plotted on this reference line. Multi-dimensional reference structures are also possible. In one possible embodiment, the reference line does not have to be explicitly defined, for example as in the case of a road marking (e.g., road lane demarcations, etc.). Suitable as a reference line, for example, is also a trajectory of the vehicle onto which the multiple environment features are projected.

This offers the advantage that regular structures are able to be shown rapidly and efficiently and may thus be evaluated or used for determining the highly precise position of the vehicle.

The multiple environment features preferably have at least two regular structures that are independent of each other, and in the step of carrying out the comparison, a relation of the at least two mutually independent regular structures is determined, and the comparison is carried out as a function of the relation. In one embodiment, one of the at least two mutually independent regular structures represents the reference line, and the distance of the at least one other structure from this reference line is used for the comparison.

For example, a relation of the at least two mutually independent regular structures is to be understood as a constant phase shift and/or a (changing) phase shift, e.g., occurring as a function of the environment, and/or lateral or longitudinal distances from one another.

This may offer the advantage of making a further feature available for determining the highly precise position, which makes the present method even more reliable and thus safer for the vehicle as a whole.

In addition, a step of determining an approximate position of the vehicle and/or a step of classifying the environment of the vehicle as a function of the approximate position is/are preferably provided, and the sensing of the environment data values takes place as a function of the classification of the environment.

An approximate position is to be understood as a position, e.g., in GPS coordinates, which is at least so imprecise that a vehicle is unable to be operated as a function of this approximate position. An approximate position, for example, is a position as it is determined and/or displayed by a navigation system. For instance, an approximate position of a vehicle allows for a localization in relation to a road section, but the determination of a traffic lane, e.g., on a multi-lane road, is already virtually impossible. An approximate position is typically determined with an imprecision of a few meters, and the imprecision depends on the environment of the vehicle, among other things.

A classification of the environment of the vehicle as a function of the approximate position is to be understood as an allocation of the environment in road classes, for example, the road class being determined the aid of a navigation system, for instance. A road class represents one of the following classes, for example: a county road, an inner-city street, a road with/without a center line, a freeway, an expressway, a rural road, on- and off ramps, etc. Depending on the actual classification of the environment, typical environment features are present, which are therefore particularly suitable for executing the present method. For example, no guardrails are to be expected on inner-city roads, and a county road has no regular illumination devices, for instance.

This may have the advantage, for instance, that the environment sensor system is adapted to the environment, which is determined as a function of the approximate position of the vehicle, in such a way that the multiple environment features are determined rapidly and reliably. This may pertain to the alignment and/or the use of a certain type of sensor, for example.

A device according to an example embodiment of the present invention for determining a highly precise position of a vehicle includes an environment sensor system for sensing environment data values which represent an environment of the vehicle, the environment including multiple environment features which have at least one regular structure, and the environment data values including at least the at least one regular structure. In addition, the device includes computing means for carrying out a comparison of the environment data values with a map; localization means for determining the highly precise position of the vehicle as a function of the comparison; and an interface for supplying a signal on the basis of the highly precise position.

Preferably, additional means/devices for determining an approximate position of the vehicle and/or additional means/devices for classifying the environment of the vehicle as a function of the approximate position are provided.

The environment sensor system and/or the computing means/device, and/or the localization means/device, and/or the interface, and/or the further means/device, and/or the additional means is/are provided to carry out a method.

Advantageous further developments of the present invention are described herein.

BRIEF DESCRIPTION OF THE DRAWINGS

Exemplary embodiments of the present invention are shown in the figures and are described in greater detail below.

In the following description of FIGS. 1, 2 and 3, the terms 'vehicle' and 'automated vehicle' are used interchangeably and do not constitute a restriction.

DETAILED DESCRIPTION OF EXAMPLE EMBODIMENTS

Figure 1:
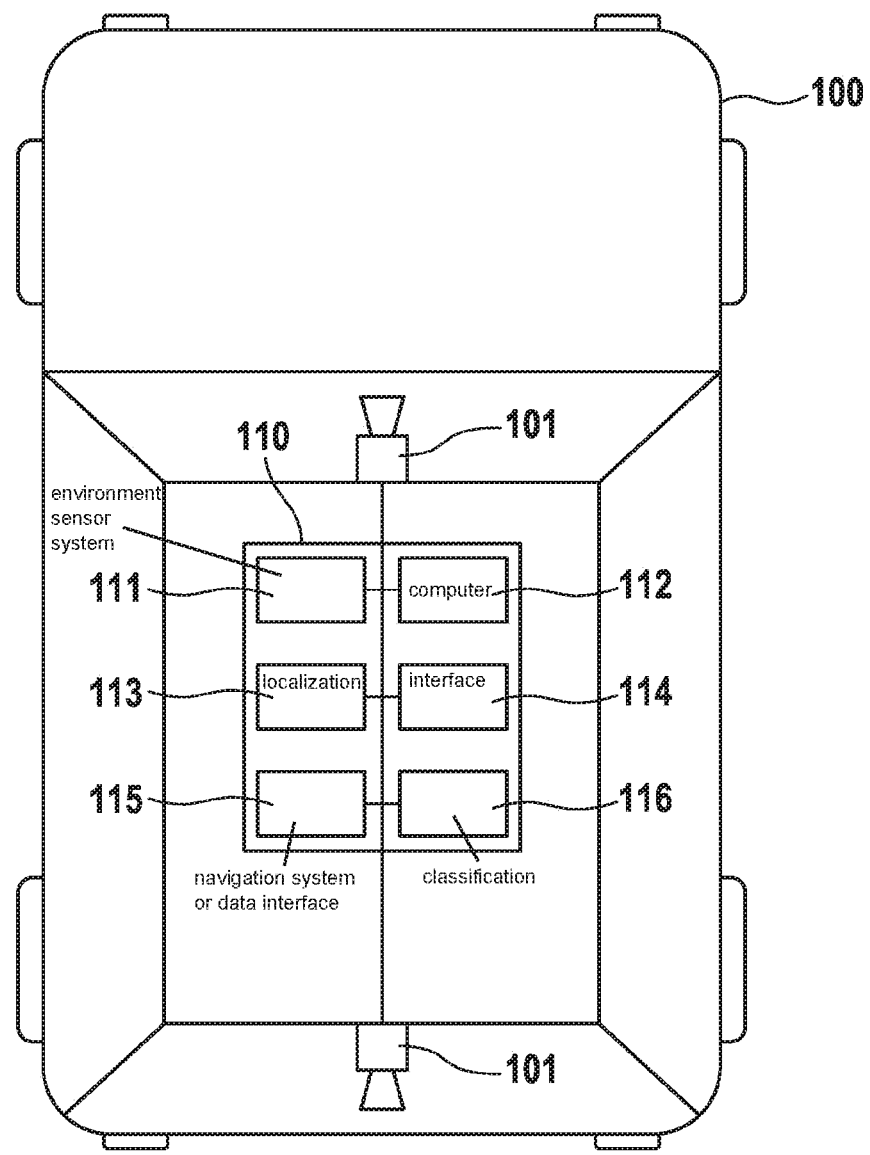
FIG. 1 shows an exemplary embodiment of a device according to the present invention.

FIG. 1 shows a vehicle 100, which includes device 110 according to the present invention for determining 330 a highly precise position of an automated vehicle 100.

For example, device 110 for determining 330 a highly precise position of an automated vehicle 100 includes an environment sensor system 111 for sensing 310 environment data values that represent an environment 200 of automated vehicle 100, environment 200 having a plurality of environment features 210, 220, which include at least one regular structure, and the environment data values including at least the at least one regular structure. In addition, the device is provided with computing means 112 for carrying out 320 a comparison of the environment data values with a digital map; localization means 113 for determining 330 the highly precise position of automated vehicle 100 as a function of the comparison; and an interface 114 for supplying 340 a signal for operating automated vehicle 100 on the basis of the highly precise position.

In one embodiment, for example, environment sensor system 111 is embodied as a computing unit (processor, working memory, hard disk), which is connected to at least one sensor 101 already provided in automated vehicle 100. In one further embodiment, the environment sensor system includes the at least one sensor itself. For example, the computing unit includes a software such that an evaluation of the sensed environment data values is carried out. In the process, distances between automated vehicle 100 and at least one of the multiple environment features 210, 220 are determined, for instance based on the disparity principle, and/or a determination of the structure and/or a detection of a regular structure of the multiple environment features 210, 220 takes place.

Computing means/device 112, for example, has a processor, a working memory and a hard disk, which includes a suitable software for carrying out 320 a comparison of the environment data values with a digital map. For example, the comparison is carried out by examining the environment data values for predefined characteristics, which depend on the specific development of the environment sensor system, for instance, these characteristics being compared with the digital map, which represents location-specific, comparable characteristics. For example, these characteristics are color values in the form of gray scales and/or shapes and/or color sequences and/or positions of a plurality of characteristics relative to one another.

Localization means/device 113, for instance, includes a computing unit (processor, working memory, hard disk) as well as a suitable software, which is developed to determine the highly precise position of automated vehicle 100 as a function of the comparison. For example, the highly precise position is determined in that a relative position of automated vehicle 100 with respect to the multiple environment features 210, 220 is determined. This is accomplished with the aid of a directional vector, for example, and/or a distance between at least one of the multiple environment features and automated vehicle 100, because the also highly precise position of the multiple environment features 210, 220 is stored in the digital map.

Interface 114 for supplying a signal for operating automated vehicle 100 on the basis of the highly precise position is developed in such a way, for example, that the highly precise position is transmitted via cable and/or in a wireless manner to a control unit for operating automated vehicle 100, for instance. Toward this end, interface 114 includes a transmitter and/or receiver device for the transmission of the data, for instance. In one embodiment, for example, interface 114 includes additional computing means/devices for adapting and/or modifying the data format.

In one embodiment, device 110 encompasses additional means/devices 115 for determining 305 an approximate position of automated vehicle 100 and/or additional means/devices 116 for classifying 306 environment 200 of automated vehicle 100 as a function of the approximate position.

Further means 115 is developed as a navigation system, for example. In another embodiment, further means 115 is developed as a data interface, for instance, which receives the approximate position from a navigation system installed in automated vehicle 100. This may also be a smartphone, for instance, which is connected to automated vehicle 100 and/or to device 110 by cable and/or in a wireless manner, e.g., via Bluetooth, etc.

Additional means 116, for instance, are developed as a computing unit (processor, working memory, hard disk) provided with a suitable software for classifying 306 environment 200 of automated vehicle 100 as a function of the approximate position.

Figure 2A:
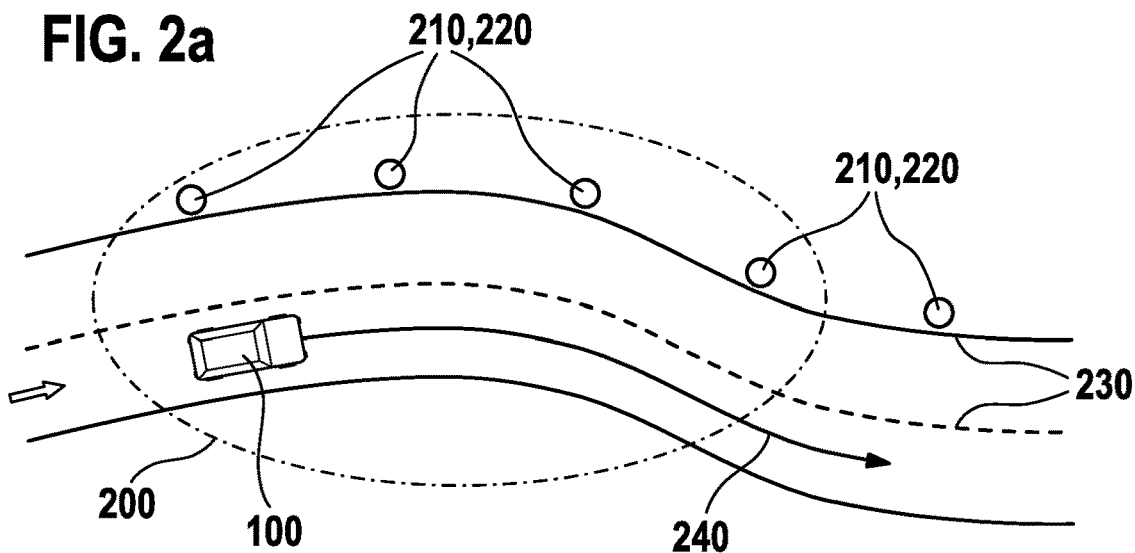
FIGS. 2a, 2b and 2c show exemplary embodiments of the method according to the present invention.

FIG. 2a shows an exemplary embodiment of method 300 in accordance with the present invention. An automated vehicle 100 is located on a road. Multiple environment features 210, 220 are located in environment 200 of automated vehicle 100, which is sensed with the aid of an environment sensor system 111, the multiple environment features 210, 220 having a regular structure, in this instance exemplarily shown as objects, which are situated at regular intervals along the road. A regularly recurring distance, for example, is to be understood as a distance that may vary within a predefined limit value, for instance, but does not exceed these limit values. As a result, the at least one regular structure represents a periodic occurrence of the multiple environment features 210, 220 along a reference structure, the reference structure in one possible embodiment corresponding to a road marking 230, e.g., a traffic lane demarcation in this case, and/or a trajectory 240 of automated vehicle 100.

In addition, for example, the multiple environment features 210, 220 may be embodied as retaining posts of guardrails, road markings, guide posts, signs, traffic lights, streetlights, concrete barriers (Jersey barrier), guide beacons, railroad tracks installed on the road, noise abatement walls and tunnel walls, light and reflector strips in tunnels, drain pipes or curbstones, in which case lateral spacings, for example, being considered regular structures. In addition, the multiple environment features 210, 220 may be embodied as retaining posts of guardrails, traffic lane markings, guide posts, signs, traffic lights, street lights, (joints of) of concrete barriers (Jersey barrier), guide beacons, joints of noise abatement and tunnel walls, lights or reflectors such as on dividing strips and/or in tunnels, sewer and/or drain covers, paving stones (e.g., at highway waste drains) or curbstone joints, in which context longitudinal distances are considered a regular structure. Moreover, the multiple environment features 210, 220 may be embodied as road markings, tunnel and/or noise abatement wall segments or paving stones and/or curbstone segments, for instance, in which case lengths, for instance, are considered regular structures. In addition, road bumps and/or uneven spots and/or brightness and/or color characteristics of road markings and/or noise abatement and/or tunnel walls and/or lights and/or reflectors and/or differences in the tire/road noise (e.g., in frequency or volume), and/or railroad ties may also be considered.

Periods and structures that change only slowly (e.g., slowly over the distance) have the advantage of being able to be ascertainable in a reliable manner even if individual of the multiple environment features 210, 220 are overlapped by other road users, for instance. In contrast to classic localization methods, it is then no longer only an environment feature whose extension is limited as much as possible that is used here (such as signs, lights, house corners, etc.), but spatially extended environment features (such as guardrails, traffic lane extensions), which are less precise on their own but considerably more robust with respect to partial changes and overlaps, for example. A determination 330 of the highly precise position at a level comparable to alternative methods is then still possible by combining individual environment features of the plurality of environment features 210, 220. If there is a change in the structure along the reference structure and this change is easy to describe, the storing of only two of the plurality of environment features 210, 220 may suffice, e.g., in the case of a linear change. Despite an extremely compact storage form, the highly precise position of automated vehicle 100 is then able to be determined by an (in this case, linear) interpolation.

Figure 2B:
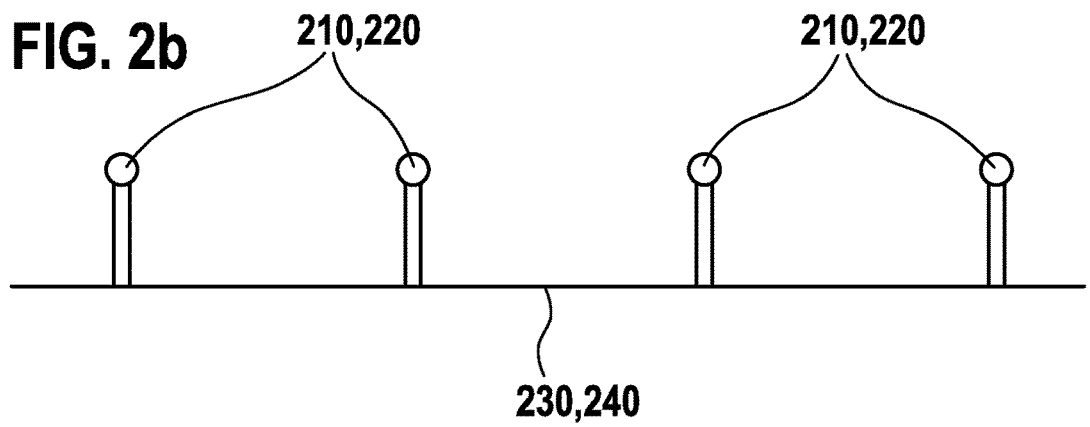

FIG. 2b shows a regular structure which represents a periodic occurrence of the multiple environment features 210, 220 along a reference structure. The reference structure is shown as a reference line, and environment features 210, 220 are thus projected onto the reference line. This projection or representation, for instance, takes place in the step of executing 320 the comparison with the aid of computing means 112.

Figure 2C:
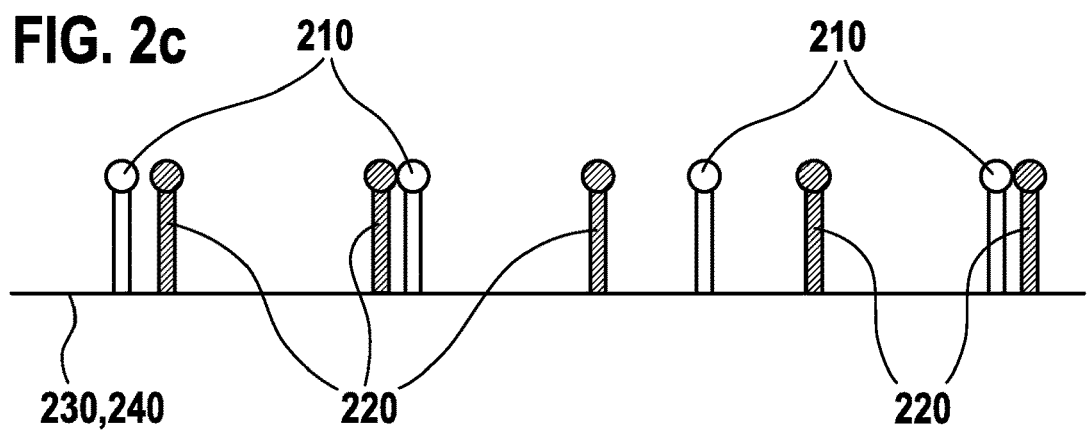

FIG. 2c shows two regular structures, illustrated by two regular structures that are independent of each other. In the step of carrying out 320 the comparison, a relation of the at least two mutually independent regular structures is determined, the comparison taking place as a function of the relation. The mutual relation is shown by a phase shift, for instance, which is determined in the step of carrying out 320 the comparison with the aid of computing means 112.

Figure 3A:
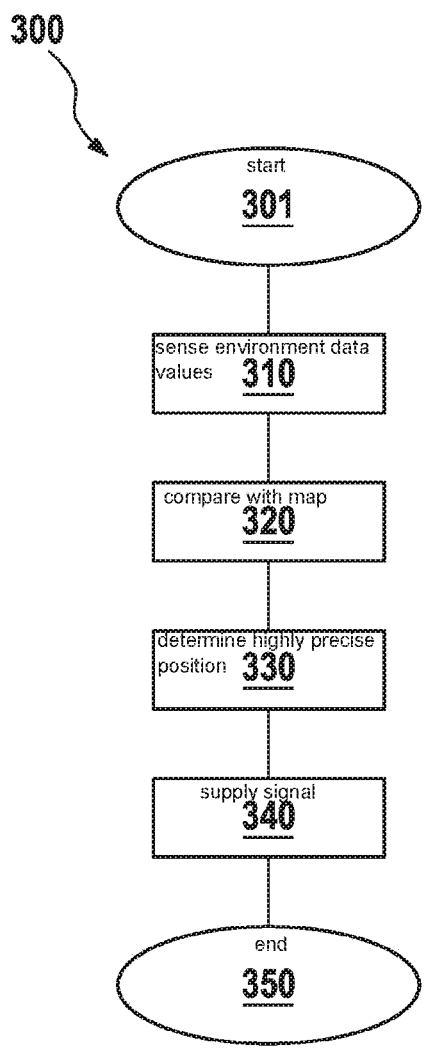
FIGS. 3a and 3b show exemplary embodiments of the method according to the present invention, in the form of a flow diagram in each case.

FIG. 3a shows an exemplary embodiment of a method 300 for determining 330 a highly precise position of a vehicle 100.

Method 300 starts in step 301.

In step 310, environment data values representing an environment 200 of vehicle 100 are sensed. Environment 200 encompasses multiple environment features 210, 220, which have at least one regular structure, and the environment data values are sensed in such a way that they encompass at least the at least one regular structure.

In step 320, a comparison of the environment data values with a map is carried out.

In step 330, the highly precise position of vehicle 100 is determined as a function of the comparison.

In step 340, a signal is supplied on the basis of the highly precise position.

In step 350, method 300 ends.

Figure 3B:
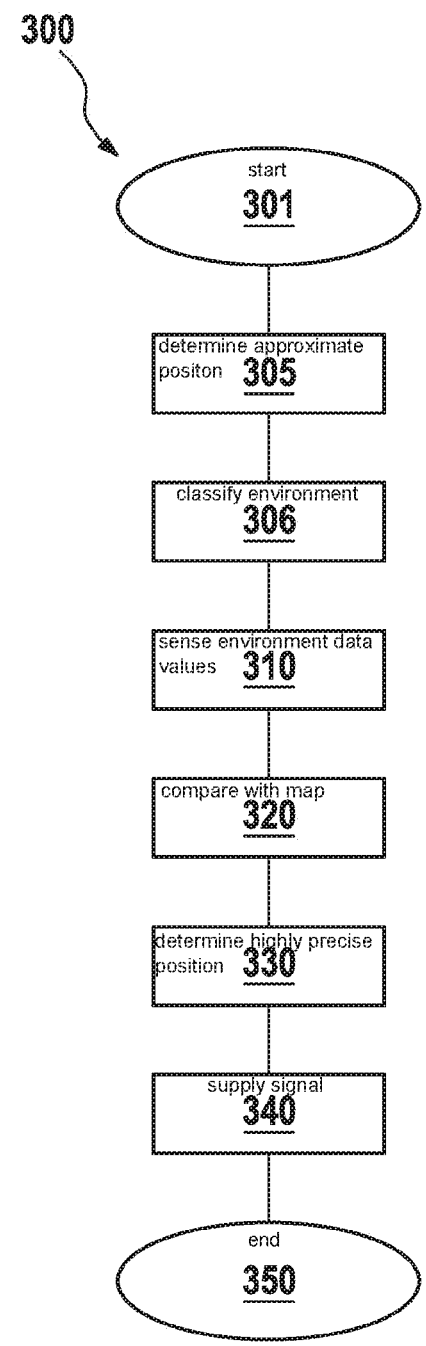

FIG. 3b shows an alternative exemplary embodiment of a method 300 for determining 330 a highly precise position of an automated vehicle 100, the method alternatively encompassing two additional steps 305 and 306. In a further embodiment, which is not explicitly shown here, method 300 alternatively encompasses only one of the two steps 305 and 306.

Method 300 starts in step 301.

In step 305, an approximate position of automated vehicle 100 is determined.

In step 306, environment 200 of automated vehicle 100 is classified as a function of the approximate position.

This is followed by steps 310 through 350 according to the description in connection with FIG. 3a.

What is claimed is:

1. A method for determining a position of an automated vehicle, the method comprising:
   sensing, via sensors, environment data values which represent an environment of the automated vehicle, the environment having a plurality of environment features which include at least one regular structure, and the environment data values including at least the at least one regular structure;
   comparing, via a processor, the environment data values with a map;
   determining, via the processor, a determined position which is the position of the automated vehicle as a function of the comparison;
   supplying, via an interface, including a cable or wirelessly, a signal based on the determined position for operating the automated vehicle based on the position; and
   determining, via the processor, an approximate position of the automated vehicle, classifying the environment of the automated vehicle as a function of the approximate position; and
   automatically controlling and operating, based on the determined position, the automated vehicle, wherein the operating of the automated vehicle includes determining, via the processor, a trajectory for the vehicle and traveling the trajectory with an automated transverse and longitudinal control, and automatically executing safety-relevant driving functions;
   wherein the sensing of the environment data values takes place as a function of the classification of the environment,
   wherein the interface includes a transmitter and receiver device for transmitting and receiving data, and wherein the interface includes an additional computing device for adapting and/or modifying a data format,
   wherein the plurality of environment features have at least two regular structures that are independent of each other, and wherein in the comparing, a relation of the at least two independent regular structures is determined, the comparing being carried out as a function of the relation,
   wherein the relation of the at least two independent regular structures includes lateral or longitudinal distances from one another, and
   wherein for fully automated operation of the vehicle, a maximum uncertainty of a precision of the determined position is about 10 centimeters.

2. The method as recited in claim 1, wherein the supplying of the signal takes place so that the map is updated as a function of the signal.

3. The method as recited in claim 1, wherein the at least one regular structure represents a periodic occurrence of the plurality of environment features along a reference structure.

4. The method as recited in claim 3, wherein the reference structure corresponds to a road marking and/or to a trajectory of the automated vehicle.

5. A device for determining a position of an automated vehicle, comprising:
   an environment sensor system to sense environment data values which represent an environment of the automated vehicle, the environment including a plurality of environment features which have at least one regular structure, and the environment data values including at least the at least one regular structure;
   a computing device, via a processor, to carry out a comparison of the environment data values with a map;
   a localization device, via the processor, to determine a determined position, which is the position of the automated vehicle as a function of the comparison;
   an interface to supply, via a cable or wirelessly, a signal based on the determined position for operating the automated vehicle based on the position;
   a positioning device, via the processor, for determining an approximate position of the automated vehicle, and classifying the environment of the automated vehicle as a function of the approximate position; and
   a controlling device, via the processor, for automatically controlling and operating, based on the determined position, the automated vehicle, wherein the operating of the automated vehicle includes determining, via the processor, a trajectory for the vehicle and traveling the trajectory with an automated transverse and longitudinal control, and automatically executing safety-relevant driving functions;
   wherein the sensing of the environment data values takes place as a function of the classification of the environment,
   wherein the interface includes a transmitter and receiver device for transmitting and receiving data, and wherein the interface includes an additional computing device for adapting and/or modifying a data format,
   wherein the plurality of environment features have at least two regular structures that are independent of each other, and wherein in the comparing, a relation of the at least two independent regular structures is determined, the comparing being carried out as a function of the relation, wherein the relation of the at least two independent regular structures includes lateral or longitudinal distances from one another, and wherein for fully automated operation of the vehicle, a maximum uncertainty of a precision of the determined position is about 10 centimeters.

6. The device as recited in claim 5, wherein the environment of the automated vehicle is classified as a function of the approximate position.

7. The device as recited in claim 6, wherein the environment data values are compared with the map, wherein the determined position of the automated vehicle is determined as the function of the comparison, and wherein the signal based on the determined position is supplied for operating the automated vehicle based on the determined position.

\* \* \* \* \*